Aug. 19, 1969   G. GRUSIN   3,462,149
DIVIDED TRANSPARENT ENCLOSURE WITH PLAYING DISC
Filed Jan. 9, 1967
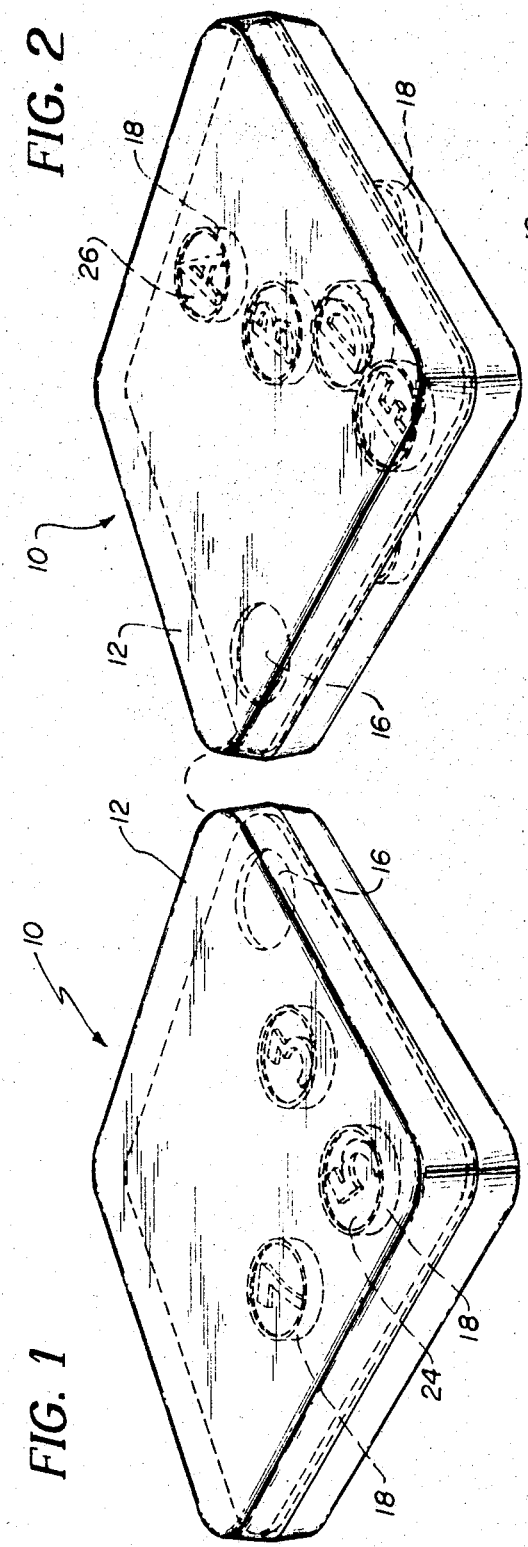
INVENTOR.
Gerald Grusin
BY Dominik, Stein &
Knechtel
Attys.

United States Patent Office 3,462,149
Patented Aug. 19, 1969

3,462,149
DIVIDED TRANSPARENT ENCLOSURE WITH PLAYING DISC
Gerald Grusin, 154 E. Erie St., Chicago, Ill. 60611
Filed Jan. 9, 1967, Ser. No. 608,153
Int. Cl. A63b 67/14; A63f 3/00; G09b 19/04
U.S. Cl. 273—113                    1 Claim

ABSTRACT OF THE DISCLOSURE

A toy or educational device including a transparent playing board in the form of a closed container having a center divider, and a number of parts slidably retained therein in a fashion such that they cannot turn over. The center divider has an aperture formed in it, through which the parts can drop, from one side of the container to the other. By appropriately coloring the surface faces of each of the parts and/or by providing appropriate indicia on them, a child can be taught to identify letters, numerals, colors, the theory of sequence and further can improve his dexterity.

---

This invention relates to a device which can be classified both as a toy and as an educational game, depending upon the manner in which it is used.

Generally, the device includes a transparent playing board in the form of a closed container having a center divider, and a number of parts slidably retained herein in a fashion such that they cannot turn over. The center divider has an aperture formed in it, through which the parts can drop, from one side of the container to the other. By appropriately coloring the surface faces of each of the parts and/or by providing appropriate indicia on them, a child can be taught to identify letters, numerals, colors, the theory of sequence and further can improve his dexterity.

A preferred construction of the device has six or more parts, depending on the size of the container and the desired complexity in the educational aspect of the device, each of which is imprinted with a different color from the others, on either one or both of its surface faces. One surface face also has an alphabet letter on it, while its other surface face has a numeral on it. The letters and numerals on the parts preferably form a consecutive sequence of letters and numerals, and each of the parts are placed in the container so that all letters are observed on one side of the center divider and all numerals on the other side of it.

The operation of the device is such that upon tilting the container, the parts slide along the center divider and through the aperture formed in it. Since the construction is such that the parts cannot turn over, letters always appear on one side of the center divider, and numerals on the other.

The object of the toy or educational device is to manipulate the container in a fashion such as to cause the parts to drop through the aperture in the center divider, in proper sequence. In using the device, children can be taught to identify letters, numerals and color. Also, less advanced children can improve their dexterity since they are forced to manipulate the container in the proper manner in order to cause the parts to drop through the aperture in the center divider.

The construction of the device is such that its use can be continuous. That is, as a player moves the parts through the aperture in the center divider, from the upper to the lower half of the container, he simultaneously sets up the next round of play which can be started immediately after turning the container over. There is no need to manipulate the container to again arrange the parts for subsequent use.

The device also has substantial value as a toy for a child to play, as well as to learn at his own speed by trial and error, either by himself or with others. It stimulates and challenges a child's co-ordination, intellect, and emotions without frustration since it incorporates such a simple, foolproof mechanism.

Children also enjoy playing with the device since they have or gain the satisfaction of being able to manipulate the container to cause the parts to drop through the aperture in the center divider. Then too, there is the fascination of moving and controlling objects without actually touching them. This latter feature of the device also helps to develop dexterity and is, therefore, an important feature.

As far as the educational aspect of the device, with the help of parents or others, children can learn to identify colors, numerals and letters, and to relate numbers and letters to mathematical and alphabetical sequence. In practicing the above, the children also develop speed in recognizing symbols, particularly in random positions.

Last, but not least, the device has a social aspect in that younger children require instruction from older children or parents. Accordingly, as soon as a child masters the game, he is ready, in turn, to teach still other children. Together, then, they can drill and test themselves in their new-learned recognition of colors, numbers and letters.

It is therefore an object of the present invention to provide an improved device which can be used both as a toy and as an education game.

Another object is to provide a device of the described type which is simple in construction, durable and safe for use by children of all ages.

Still another object is to provide a device of the described type which may be used to teach children to identify colors, numerals and/or letters.

It is still another object to provide a device of the last-mentioned type which may be used to teach children the theory of sequence.

A still further object is to provide a device of the above type which will help develop dexterity.

Still another object is to provide a device of the above type which is easily manipulated by small children.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawing, in which:

FIGS. 1 and 2 are perspective views of a device exemplary of the invention, illustrating the appearance thereof when the objects are displayed in each of the two compartments;

FIG. 3 is a transverse sectional view of the device of FIGS. 1 and 2; and

FIGS. 4, 4A and 4B are views of the objects enclosed within the device, illustrating the two sides and the end thereof.

Similar reference characters refer to similar parts throughout the several views of the drawing.

Referring now to the drawing, there is shown a device 10, hereinafter referred to as the game 10, which includes a transparent box-like enclosure 12 having an opaque center divider 14 which has an aperture 16 in it. Enclosed within the enclosure 12 are a number of playing pieces 18 which are adapted to pass through the aperture 16. The spaces 20 and 22 formed in the enclosure 12 by the divider 14 are of a size such that the playing pieces cannot turn over. Accordingly, when the playing pieces 18 are in the upper space 20, only the faces 24 thereof are exposed. When in the lower space 22, only the faces 26 thereof are exposed. The faces 24 and 26 of the playing pieces 18 have appropriate indicia, such as numerals, or letters of the alphabet on them, as illustrated in FIG. 4, so that they may be used for play and/or educational purposes, in the manner generally indicated above.

More specifically, the game 10 includes an enclosure 12 which preferably is fabricated of two identical, complimentary halves 12a and 12b formed from a high impact plastic. The enclosure 12 also can be formed of other appropriate materials such as glass, however, plastic is preferred because of its durability. Also, it can be easily molded, and the two halves affixed together by ultrasonically welding the joint between them, or by cementing or or mechanically sealing the joint in any other suitable fashion. The enclosure 12 is illustrated as being square-shaped, however, it will be apparent from the description below that it also can be rectangular, circular, oval or numerous other shapes as well.

The divider 14 likewise can be of a high impact plastic and it is preferably opaque. Opaquing can be provided by painting the opposite sides thereof the same or different colors, or by using a colored plastic. It is preferred to have each of the opposite sides of a different color, to provide many more colors to be identified. The aperture 16 is formed in the divider 14, near one of its corners to provide sufficient space on the divider for the playing pieces to move around on it. The divider is centrally disposed between the two halves 12a and 12b of the enclosure and, as indicated above, the spaces 20 and 22 formed between the walls of the enclosure and the divider are such that the playing pieces 18 cannot turn over.

The playing pieces 18 are in the form of circular-shaped disks and are of a size which permits them to drop through the aperture 16, from the space 20 to the space 22. The playing pieces 18 each also could be of a different geometrical shape such as a square and a rectangle, so as to provide different shapes to be identified, if desired. In such a case, the aperture 16 would, of course, be of sufficient size to permit each of the different shapes to drop through it.

The upper faces 24 and the lower faces 26 of each of the playing pieces each are preferably of a different color so as to provide a number of different colors to be identified. Also, each of the faces 24 and 26 of each of the playing pieces 18 has appropriate indicia or symbols on them to be identified. The indicia or symbols on the upper faces 24 advantageously can be numerals, and each of the faces preferably has a different, consecutive number on it, to provide a sequence of numbers. Likewise, the indicia or symbols on the lower faces 26 of respective ones of the playing pieces can advantageously be the consecutive letters of the alphabet.

The object of the game 10, as indicated above, is to manipulate the enclosure 12, by tilting it, to cause the playing pieces 18 to slide about the divider 14 and through the aperture 16, from one of the spaces 20 or 22 to the other. The game 10 can be played in this fashion by younger children and, with proper instruction, children of all ages can be taught to identify the different colors, the different letters and the different numerals. As the ability of the child advances, he also can be taught to relate the letters and numbers to alphabetical and mathematical sequences, respectively. The mode of operation also helps less advanced children to develop their dexterity. Accordingly, it is apparent that the game 10 can be used as simply a toy or as an educational device or to develop dexterity.

It may also be noted that its construction is such that the next round of play is automatically set up on the opposite side of the divider 14 as the playing pieces 18 drop through the aperture 16. Play can therefore be continuous, if desired, for the playing pieces 18 do not have to be re-oriented to start again.

An alternative arrangement of the game 10 to provide a device for learning a sequence of letters, or numerals, is to provide on one of the faces 24 or 26 of the playing pieces 18 the consecutive letters of the alphabet, or consecutive numbers. On the opposite face thereof, the sequence of letters, or numbers, preceding and including the letter, or number, on the playing piece being dropped through the aperture 16. For example, the playing piece having the letter A on its one face would have only the letter A on its opposite face. The playing piece having the letter B on its one face would have the letters A and B on its opposite face; and so on with the letters C, D, etc. Numbers would be placed on the faces of the playing pieces in a like manner. With this arrangement, a child can learn to manipulate the enclosure 12 to cause the playing pieces 18 to drop through the aperture 16 and thereafter turn the enclosure over to determine whether he is causing the playing pieces to drop through the aperture in the proper sequence, by observing the sequence of letters on the playing pieces.

A game 10 has been constructed which has an enclosure 12 approximately 8 inches square and 1 inch thick, with a divider 14 therein providing two spaces 20 and 22 each approximately ½ inch in width. Six playing pieces each approximately 1¼ inches in diameter and 5/16 inch thick are retained with the enclosure 12. An aperture 16 approximately 1⅜ inches in diameter is provided in the divider 14. Each of the faces of each of the playing pieces is a different color and the upper faces 24 thereof each have one of the numbers 1–6 on them. The lower faces 26 each have one of the letters A–F on them. It is found that the game 10 functions satisfactorily when manipulated in the above-described manner.

The size of the enclosure 12 and the number of playing pieces 18 can be varied, to provide a game 10 of desired complexity. Also, the indicia on the playing pieces 18 can be such as to teach children letters, numbers, shapes, colors or other information.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims, are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A playing device comprising a transparent enclosure having an opaque divider therein for dividing it into at least two compartments, an aperture in said divider, and a plurality of playing pieces in the form of circular-shaped discs retained within said enclosure, each of said playing pieces being adapted to drop through said aperture from one of said compartments to the other and having two faces which are viewable respectively when said playing pieces are in one or the other of said compartments, said two faces of each of said playing pieces having an indicia on it and said playing pieces being retained in said device with said indicia on one face being visible only in one of said compartments and said indicia on the other one of said two faces being visible only in the other one of said compartments, the width of each of said compartments being such that said playing pieces cannot turn over in them.

References Cited

UNITED STATES PATENTS

| | | | |
|---|---|---|---|
| 466,121 | 12/1891 | Paige | 273—115 |
| 473,992 | 5/1892 | Williams-Foote | 273—126 |
| 1,136,552 | 4/1915 | Nelson | 273—126 |

FOREIGN PATENTS

| | | |
|---|---|---|
| 23,621 | 2/1904 | Great Britain. |
| 752,110 | 2/1956 | Great Britain. |

ANTON O. OECHSLE, Primary Examiner

T. ZACK, Assistant Examiner

U.S. Cl. X.R.

35—35; 273—126